(12) United States Patent
Chen et al.

(10) Patent No.: US 9,535,984 B2
(45) Date of Patent: Jan. 3, 2017

(54) METHOD AND DEVICE FOR GENERATING SPECIAL TOPIC PAGES

(71) Applicant: Alibaba Group Holding Limited, George Town, KY (US)

(72) Inventors: Xudong Chen, Hangzhou (CN); Yidong Xie, Hangzhou (CN); Dongming Ji, Hangzhou (CN)

(73) Assignee: Alibaba Group Holding Limited (KY)

( * ) Notice: Subject to any disclaimer, the term of this patent is extended or adjusted under 35 U.S.C. 154(b) by 324 days.

(21) Appl. No.: 14/159,176

(22) Filed: Jan. 20, 2014

(65) Prior Publication Data

US 2014/0207742 A1   Jul. 24, 2014

(30) Foreign Application Priority Data

Jan. 22, 2013   (CN) .......................... 2013 1 0022710

(51) Int. Cl.
G06F 17/30   (2006.01)

(52) U.S. Cl.
CPC ..... G06F 17/30705 (2013.01); G06F 17/3089 (2013.01); G06F 17/30345 (2013.01)

(58) Field of Classification Search
CPC ............ G06F 17/30705; G06F 17/3089; G06F 17/30345
See application file for complete search history.

(56) References Cited

U.S. PATENT DOCUMENTS

| | | | |
|---|---|---|---|
| 6,073,170 A | 6/2000 | Sumita et al. | |
| 6,751,611 B2 | 6/2004 | Krupin et al. | |
| 2007/0005646 A1 | 1/2007 | Dumais et al. | |
| 2009/0282013 A1 | 11/2009 | Joshi et al. | |
| 2010/0082659 A1 | 4/2010 | Reddy et al. | |
| 2011/0125739 A1 | 5/2011 | Wexler et al. | |
| 2012/0036085 A1* | 2/2012 | Srivastava ........... | G06Q 10/067 705/348 |
| 2013/0212110 A1 | 8/2013 | Stankiewicz et al. | |

FOREIGN PATENT DOCUMENTS

| | | |
|---|---|---|
| JP | 2001331410 | 11/2001 |
| WO | 2009136990 | 11/2009 |

* cited by examiner

*Primary Examiner* — Jorge A Casanova

(74) *Attorney, Agent, or Firm* — Van Pelt, Yi & James LLP

(57) ABSTRACT

Embodiments of the present application relate to a method for generating special topic pages, a device for generating special topic pages, and a computer program product for generating special topic pages. A method for generating special topic pages is provided. The method includes determining a configuration file bound to a special topic category corresponding to a received keyword, determining sub-categories that are under a category associated with the keyword in a quantity equal to the special topic content page module quantity in the configuration file, regarding the sub-categories as sub-category keywords in special topic content page modules, looking up product information that meets the query condition for the special topic content page modules in a database, regarding the looked up product information as content in the special topic content page modules, and generating the special topic content page modules within the special topic page.

15 Claims, 14 Drawing Sheets

| iphone4 | | | | | |
|---|---|---|---|---|---|
| Sellers by Rank: | | | | iPhone4 | |
| [1] Lin Haoyu | | | | | |
| [2] Fao Qi Feng | | | | | iPhone 4 |
| [3] Shenzhen Wanen Co | Apple iPhone4 ¥ 1980.0/Each | Used iPhone4 ¥ 1650.0/Each | iPhone4 China Mobile ¥ 2000.0 | iPhone4 16G ¥ 1700.0 | Apple iphone4 8G/16G/32G ¥ 2050.0 |
| [4] Shenzhen Zuerjia | | | | | |
| [5] Yang Jiang Mobile Phone Co | | | | | | iPhone4 Authentic Product Wholesale

METHOD AND DEVICE FOR GENERATING SPECIAL TOPIC PAGES

CROSS REFERENCE TO OTHER APPLICATIONS

This application claims priority to People's Republic of China Patent Application No. 201310022710.X entitled A METHOD AND EQUIPMENT FOR GENERATING AND UPDATING SPECIAL TOPIC PAGES, filed Jan. 22, 2013 which is incorporated herein by reference for all purposes.

FIELD OF THE INVENTION

The present application relates to a method and device for generating special topic pages.

BACKGROUND OF THE INVENTION

A special topic page is a type of aggregator page that is generated in connection with a product or commodity within a special topic category. The special topic category may be an industry or a theme. Examples are an aggregator page generated about MP3 products within the consumer products industry, an aggregator page generated about acrylonitrile butadiene styrene (ABS) plastic products in the raw materials industry, and an aggregator page generated about sports news in the news industry.

Using the aggregator page relating to MP3 products within the consumer products industry shown in FIG. 1 as an example, a special topic page separately creates a plurality of page modules according to different aspects, such as features and brands, of MP3 products. For example, a page module is created for MP3 products without an FM tuner feature, and a page module is created for Apple-brand MP3 products. Each page module includes a certain number of pieces of feature-specific or brand-specific MP3 product information for the best-selling MP3 products so that users can quickly look up MP3 products with high sales volume according to desired features or brands while browsing the special topic page.

FIG. 1 is an illustration of a conventional special topic page. Product information included in each page module of the special topic page shown in FIG. 1 can be product information acquired from a product sales website's own background database or product information acquired from background databases of other product sales websites. MP3 product information can include MP3 product images, names, model numbers, vendors, sales volumes, and other such information.

In addition to including the page modules for the product information, the special topic page can also include page modules relating to search and login/register modules of an ordinary page.

Types of page modules for product information included in the special topic page are also called special topic content page modules (e.g., the page module in FIG. 1 created for MP3 products without an FM tuner feature). A type of page module that is in a special topic page and that does not include product information, but includes service functions provided by the special topic page is called a service page module (e.g., the page module in FIG. 1 created for performing a searching function).

The generated special topic page is stored in the form of HyperText Markup Language (HTML) in a server. FIG. 2 is a diagram of two conventional service page modules in a special topic page. Using a "shopsearch" service page module (displayed as "Search this shop") and a "customcontent" service page module (displayed as "Customized Content Zone") shown in FIG. 2 as examples, HTML code of the "shopsearch" service page module and the "customcontent" service page module stored in the server are shown below:

Code 1

```
iv id="shopsearch"> //"shopsearch" service page module
...
</div>
<div id="customcontent"> //"customcontent" service page module
...
</div>
```

With respect to Code 1 above, because the code for creating the "shopsearch" service page module is located in front of the code for creating the "customcontent" service page module, the "shopsearch" service page module is located on top of the "customcontent" service page module in the generated special topic page, as shown in FIG. 2.

After a special topic page is generated, content of the special topic page is not fixed and unchanging. Ordering of various page modules in the special topic page and the content of the page modules can be adjusted according to actual need. For example, reasons for adjusting content in the special topic page include changing levels of user interest, shifts in product popularity, and even seasonal changes.

Currently, adjusting the content of a special topic page typically includes providing visualized operating functions in the generated page modules (including service page modules and special topic content page modules). FIG. 3 is a diagram of conventional visualized operation functions of service page modules. As shown in FIG. 3, the following visualized buttons in the "customcontent" service page module are provided: an editing function button (displayed as "Edit"), a transfer-up function button (displayed as an Up Arrow), a transfer-down function button (displayed as a Down Arrow), a delete function button (displayed as "Delete"), and an add function button (displayed as "Add module"). The visualized buttons are used to adjust the sequence of "shopsearch" service page modules and "customcontent" service page modules in the special topic page based on changes in levels of user interest. FIG. 4 is a diagram of two service page modules after their order has been switched. After clicking the transfer-up function button in the "customcontent" service page module, one switches the order of the "shopsearch" service page module and the "customcontent" service page module within the special topic page (the special topic page following the adjustment to the page module sequence is shown in FIG. 4).

After the order of the "shopsearch" service page module and the "customcontent" service page module within the special topic page has been switched, the positions of the HTML code stored in the server can also be switched. As shown below in Code 2, Code 2 will replace Code 1 in the server in order to exchange the positions of the two service page modules.

Code 2

```
<div id="customcontent" > //"customcontent" service page module
...
</div>
<div id="shopsearch"> // "shopsearch" service page module
```

-continued

```
Code 2

...
</div>
```

Adjusting special topic page content by switching the positions of two service page modules is shown in FIGS. 3 and 4. If one is going to make an adjustment to the content within a page module in the special topic page, for example, an adjustment to the content in the "customcontent" service page module, the content in the "customcontent" service page module is adjusted by clicking the editing function button in the "customcontent" service page module and the HTML code for the "customcontent" service page module originally stored in the server is replaced with the HTML code of the edited "customcontent" service page module. Accordingly, the goal of adjusting the content in the "customcontent" service page module can be implemented.

The order of special topic content page modules and the content in special topic content page modules are adjusted similarly to the way in which the service page modules are adjusted.

Typically, the service page modules in a special topic page are not modified frequently because the service page modules provide users with page operation services. However, the content in the special topic content page modules regularly undergoes changes. Therefore, the content in the special topic content page modules is to be updated frequently as described above.

The above approach for adjusting special topic page content relates to a single page. In other words, when content of a special topic content page module in a special topic page is to be adjusted, someone manually operates the visualized operation functions of the special topic content page module. Although the visualized operation functions are relatively easy to use, when the content of special topic content page modules of tens of thousands, even hundreds of thousands, of special topic pages are frequently adjusted, the manually implemented visualized operation functions are inefficient. Also, avoiding operator error leading to content adjustment errors in a large volume of manual operation functions is difficult.

BRIEF DESCRIPTION OF THE DRAWINGS

Various embodiments of the invention are disclosed in the following detailed description and the accompanying drawings.

FIG. 8 is a diagram of an embodiment of a special topic content page module.

DETAILED DESCRIPTION

Figure 1:
FIG. 1 is an illustration of a conventional special topic page.
Figure 2:
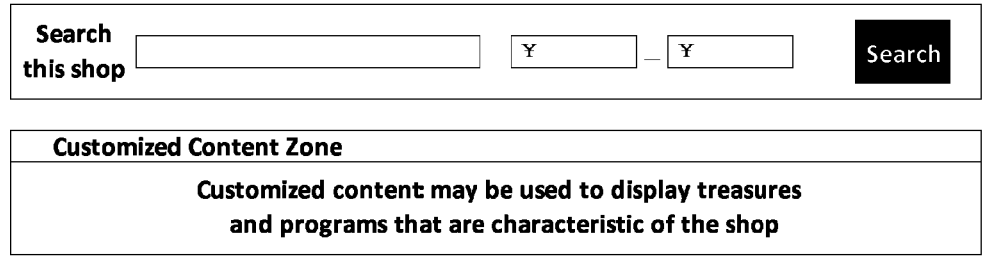
FIG. 2 is a diagram of two conventional service page modules in a special topic page.
Figure 3:
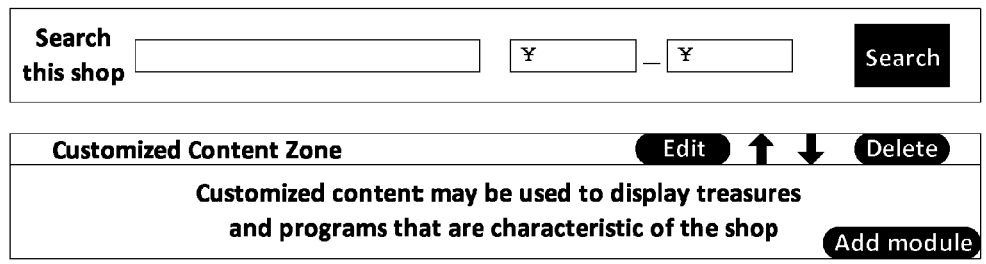
FIG. 3 is a diagram of conventional visualized operation functions of service page modules.
Figure 4:
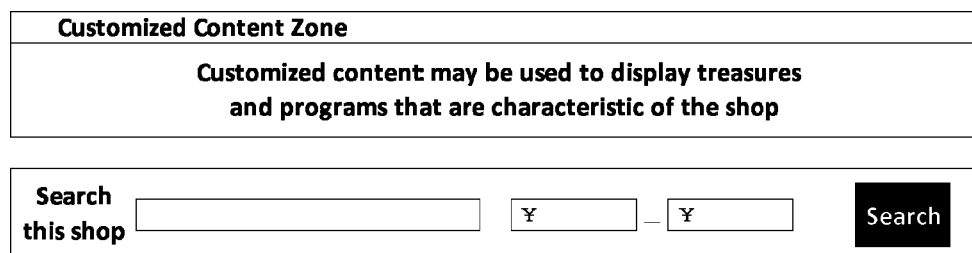
FIG. 4 is a diagram of two service page modules after their order has been switched.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In order to increase the efficiency of special topic page updates while avoiding errors that occur with manual operation functions, a scheme for updating special topic pages is presented. The scheme no longer uses page module visualized operation functions to manually update the content of special topic pages. Instead, the scheme generates shared configuration files for a special topic page of different products belonging to the same special topic category using similarity in special topic page structures generated for the different products belonging to the same special topic category and parameter information relating to the generation of special topic content page modules that is configured in a configuration file. The parameter information includes a quantity of special topic content page modules included in the special topic page and a query condition that the product information included in each special topic content page module is to meet. In various embodiments, a "product" refers to a commodity, service, virtual good, and anything else of value or utility.

In some embodiments, in the event that a special topic page for a certain product is generated based on a special topic category to which the product belongs, the system looks up a configuration file generated for special topic pages of the special topic category and then generates special topic content modules in the special topic page based on parameter information associated with generation of special topic content page modules in the configuration file.

In the event that special topic pages having the same special topic category are to be updated, the content of the configuration file generated for the special topic category can be adjusted according to updating needs so that the special topic pages of the special topic category have their special topic content page modules updated based on the adjusted-content configuration file. As a result, when a large quantity of the special topic pages having the same special topic category have their content updated, only one update of the configuration file shared by the special topic pages having the same special topic category is performed. The amount of work involved in updating special topic pages is reduced. Related automatic operations which make use of updated configuration files effectively increase the efficiency of special topic page updating, endowing the updating process of the special topic pages with a high degree of real-time capability. In addition, these automated operations of special topic pages updated by adjusting based on the configuration files are not likely to produce errors. Thus, updating mistakes are reduced.

The special topic category of consumer products is used as an illustrative example. In this example, product information included in special topic content page modules is acquired by querying a predetermined database. The product information in the database could have been captured from one or more product sales websites. Content of the product information includes product names, images, and vendors, as well as satisfaction levels, click rates, unique visitors (UV), user stay times, etc. on specified pages (e.g., a product sales website page) for products represented by the product information.

With respect to the unique visitors (UV), when the user opens a webpage, a session number is automatically created at the server to identify the user. The user browses the webpage multiple times using this session number, and the web site records the user as a unique visitor. For example, within a 24 hour period, the user with the same session number can repeatedly visit the website, but the user is regarded as one unique visitor.

Regarding other information about the special topic category, the product information included in the special topic content page modules can be product information from a website background server that publishes products related to the special topic category.

Figure 5A:
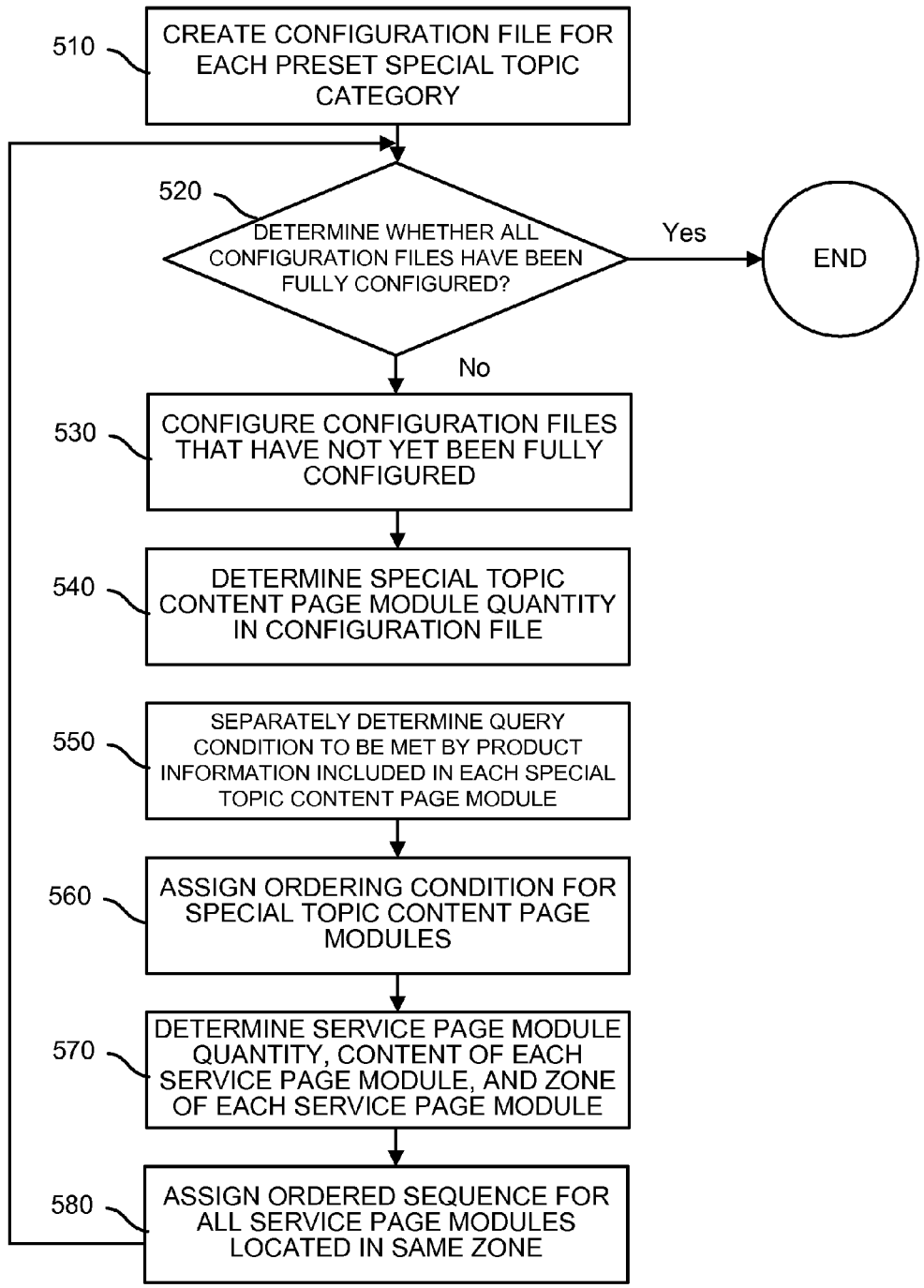
FIG. 5A is a flowchart of an embodiment of a method for generating a special topic page configuration file.

FIG. 5A is a flowchart of an embodiment of a method for generating a special topic page configuration file. In some embodiments, the method 500 is implemented by a server 1510 of FIG. 15 and includes:

In 510, the server creates a configuration file for each preset special topic category.

In some embodiments, the configuration file is created by an administrator by default (e.g., the configuration file relating to a particular category is provided as the default configuration file), and if the user would like to change some of the parameters set up by default, the administrator or the user can modify the parameters of the configuration file.

For example, preset special topic categories include special topic categories, such as consumer products, raw materials, news, or other themes. In some embodiments, with the understanding that additional special topic categories may appear as technologies develop, a default configuration file for unknown special topic categories is created. In some embodiments, the default configuration file content is adjusted so that the adjusted default configuration file content fulfills a new special topic category of the configuration file.

Please note that creating a configuration file is not considered the same as generating the configuration file because the created configuration file is not regarded as having been generated until the content of the configuration file has been fully configured.

In 520, the server determines whether all of the created configuration files have been fully configured. In the event that all the created configuration files have been fully configured, the method 500 for generating the configuration file ends.

The determination of whether all the created configuration files have been fully configured is a scheme for serially configuring all special topic category configuration files. In other words, each configuration file is configured in sequence. This approach reduces the server resources used to generate the configuration files and lowers the software and hardware requirements. In some embodiments, the determination of whether all the created configuration files have been fully configured is performed in parallel. In this way, the efficiency of generating the configuration files is increased.

In some embodiments, the content in the configuration file includes three parts as described below:

In a first part, the content includes special topic category information at which the configuration file is directed. For example, the title of the configuration file relates to the special topic category information.

For example, the special topic category information refers to the name of the special topic. For example, to create a special topic page for mobile handsets, a corresponding configuration file is named handsets.html, which is the title of the configuration file. In another example, if the special topic page configuration file is named "othername.xml," the title of the configuration file refers to the term handset (i.e., the name used to describe the special topic page, which can be unrelated to the name of the configuration file). Since configuration files are individually created for different special topic categories, the content in first parts of different configuration files will be different. In some embodiments, the content of the first part is configured during the creation of the configuration file.

In a second part, the content is relevant parameters of the special topic content page modules in the special topic page. In some embodiments, the content of the second part is custom-configured according to special topic category needs.

In a third part, the content is relevant parameters of service page modules in the special topic page. In some embodiments, the content of the third part is custom-configured according to service needs. In other words, to adjust a configuration of the page service modules based on the special page service's needs, the corresponding description of widgets in code 3 is provided. Assume that the original description of a web service module only includes position and templatepath (<widget><position>header</position><templatePath>header/commodity_qingcheng.vm<templatePath></widget>). When service needs change, the widget node will include more content to have a modified structure similar to code 3 (in comparison to code 3, the widget node includes a cmsStatus section). Each widget section corresponds to a service module in a one to one relationship, the location being described by an independent position node (any position in the page).

In 530, in the event that all the created configuration files have not been fully configured, the server configures configuration files that have not yet been fully configured based on special topic categories corresponding to the configuration files that have not yet been fully configured.

In 540, the server determines a special topic content page module quantity in a configuration file based on a special topic category corresponding to the configuration file.

The special topic content page module quantity determined in the configuration file corresponds to a number of special topic content page modules included in the special topic page. The special topic content page module quantity can be customized and adjusted as needed by the user. In some embodiments, the special topic module's maximum quantity is set by the user.

In 550, the server separately determines a query condition to be met by product information that is to be included in each special topic content page module.

The query condition, which is a constraining condition on product information included in a special topic content page module, provides help during the generation of the special topic page. In the event that the special topic page is generated using the constrained product information, the server is able to go to a database and look up product information with the query condition for a certain special topic content page module and regard the looked up product information as content of the special topic content page module.

In some embodiments, content of the query condition includes any constraining condition on product information content, such as the following conditions: a satisfaction level for the product represented by the product information when displayed on a specified page is at least a first set value; a click rate for a product represented by the product information when displayed on a specified page is at least a second set value; a UV for the product represented by the product information when displayed on a specified page is at least a third set value; when the product represented by the product information is displayed on a specified page, a user length of stay on the specified page is at least a fourth set value; or any combination thereof.

In some embodiments, the specified page is a product sales website page. The product information generated in a product sales website is stored in a database and is used when generating or updating special topic content page modules of special topic pages.

The first through fourth set values are not inter-related. The above satisfaction level, click rate, UV, and user length of stay are used as conditions for investigating product information. The conditions do not need to be related, and one or more conditions can exist. For example, a page includes three special topic page modules ABC: Module A only needs products with a satisfaction level greater than 99.8%, module B needs products with a satisfaction level greater than 99.8% and a UV greater than 100, and module C needs products with a satisfaction level greater than 90% or a UV greater than 50. The three modules are independent. Thus filters between the three modules are unrelated. In some embodiments, different names are used to differentiate between numerical values.

In 560, the server assigns an ordering condition for special topic content page modules.

In some embodiments, the server determines whether the quantity of special topic content page modules in the configuration file is greater than one, and in the event that the quantity of special topic content page modules in the configuration file is greater than one, the ordering condition of the plurality of special topic content page modules in the special topic page is assigned.

Before the special topic page is generated using the configuration file, the various special topic content page modules in the configuration file are undifferentiated and have not been ordered, for example, from first to last. As an aspect, when the special topic page is generated, the special topic page is generated in relation to a certain product. Each sub-category under a category associated with the product corresponds to a special topic content page module in the configuration file. In other words, the product information included in a special topic content page module is product information looked up in the database using a sub-category keyword that is a sub-category corresponding to the special topic content page module. Therefore, each special topic content page module in the special topic page is different, and all the special topic content page modules are ordered according to the ordering condition set in the configuration file.

For example, a category keyword "digital (6)" includes subcategory keywords "MP3 (61)," "handset (62)," "camera (71)," etc. So the keyword "digital" can also be a sub-category keyword for the category of "digital," and a tree structure exists. In another example, a category keyword "handset (62)" include sub-category keywords of "Samsung handsets (621)," "Sony handsets (622)," "iPhone handsets (623)," "domestic handset (624)," "handset cover wholesale (625)," etc.

The ordering condition can be set up in any appropriate manner as configured by, for example, an administrator. For example, the ordering condition is set so that special topic content page modules whose corresponding sub-categories have higher priority levels will be placed closer to the top. In other words, product information, which is looked up with sub-category keywords that are sub-categories with higher priority levels, are to be placed in the special topic content page modules that are placed closer to the top.

In some embodiments, a priority level of a sub-category is related to product popularity under that sub-category: the higher the popularity, the higher the priority level. For example, to use special topic module's click rate to compute the weighted order, score=(offer1 click+offer2 click+ . . . offern click)/topic page views. Click rate refers to the user's opening of a page (click) and the total number of clicks within the page. In some embodiments, weights are set based on the click rate and the length of stay. If the weight of the click rate is R and the weight of the length of stay is 1−R, the weight can be computed by the equation K=A*R+B*(1−R [A>0, B>0, where A is the total number of clicks for all the product information in the module, and B is the length of stay of all the users for the products in the module]. Of course, the method is not limited from using other characteristics of the product under a sub-category to indicate the sub-category's priority level. For example, sales volume of a product under a sub-category could be used to indicate priority level.

In some embodiments, the ordering condition is adjusted as needs change.

In addition to configuring the special topic content page modules, options for each special topic content page module can be configured. An example of an option is a storage address in the event that the special topic content page modules are expressed in HTML code when a special topic page is generated.

In 570, in the configuration file, the server determines a service page module quantity, the content of each service page module, and a zone of each service page module on the special topic page.

Figure 5B:
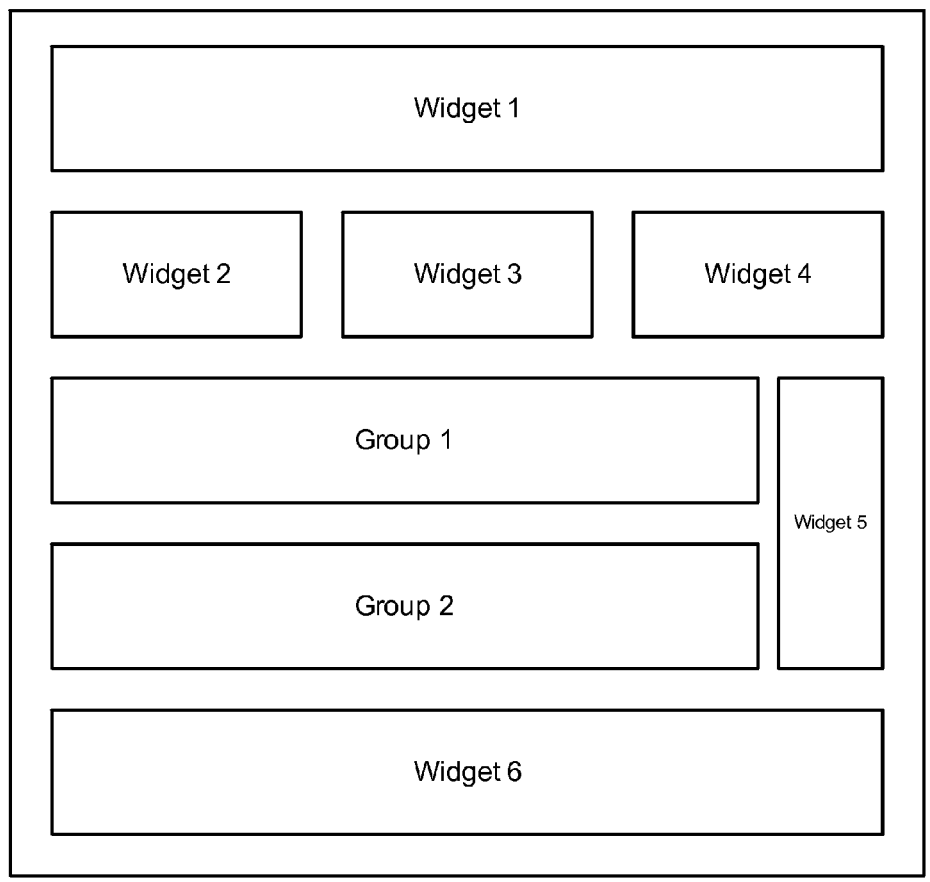
FIG. 5B is a diagram of an embodiment of zones in a special topic page.

FIG. 5B is a diagram of an embodiment of zones in a special topic page. Widgets 1-6 correspond with service page modules. In this example, the position is set by the user based on the user's needs. For example, a user specifies widget 1's position as header, widget 2's position as 220×220.left, widget 3's position as 300×220.middle, widget 4's position as 220×220.right, widget 5's position as 100×300.group.right, and widget 6's position as bottom.

In the configuration file, the service page module quantity corresponds to a number of service page modules included in the special topic page. The content of each service page module and the zone of each service page module on the special topic page correspond to the content and the zone of each service page module included on the special topic page.

Since service page modules are not modified frequently, the zone of each service page module on the special topic page can be directly determined from the configuration file. For example, a header zone and a bottom zone on the special topic page fix positions of the service page modules of the special topic page.

Content of service page modules relates to service functions of those service page modules. For example, if the content of a service page module is "search," the service page module is used to search during the generation of a special topic page.

Referring back to FIG. 5A, in 580, when a plurality of service page modules are located in the same zone of the special topic page, the server assigns an ordered sequence for all the service page modules located in the same zone.

Figure 6:
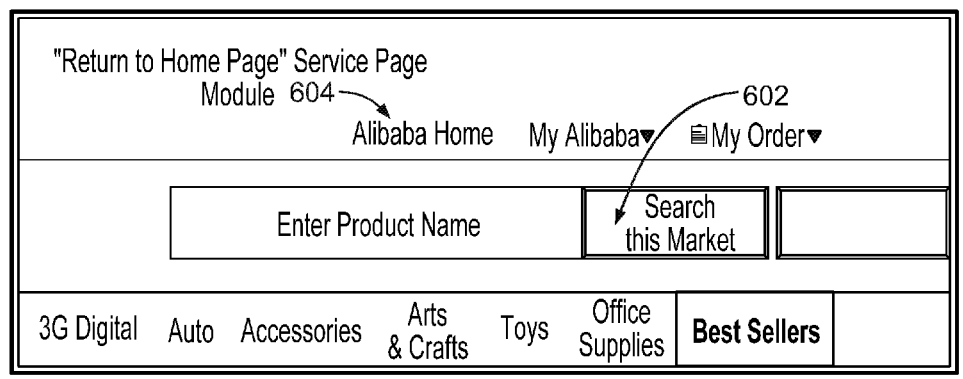
FIG. 6 is a diagram of an embodiment of two service page modules.

FIG. 6 is a diagram of an embodiment of a webpage with two service page modules. In this example, a service page module 602 whose content is "search" and a service page module 604 whose content is "return to home page" are both located in a header zone of a special topic page. As an example, the ordered sequence is set so that the "return to home page" service page module is on top of the "search" service page module. At this point, HTML code for creating the "return to home page" service page module is located in front of HTML code for creating the "search" service page module. If the order of these two service page modules is to be changed, the HTML code sequence is to be changed to change the order of the two service page modules.

In some embodiments, in addition to the above configuration of the service page modules, options for each service page module are also configured. An example of an option is a storage address if each service page module is expressed in HTML code when the special topic page is generated.

After the assigning of the ordered sequence of all the service page modules located in the same zone is completed, the server completes the configuration of the content of the configuration file. At this point, the configuration file is regarded as having been completely generated. In some embodiments, the determining of whether all the created configuration files have been fully configured is repeated until all the created configuration files are completely configured.

The description below of Code 3 is used to describe specific content in generated configuration files:

---
Code 3
---

<category> // is a configuration file created for a certain special topic category
    <name>XXX</name> // The configuration file name is XXX
    <keywords>YYY</keywords> // Keywords in the configuration file can be undefined. When a special topic page is generated using the configuration file, a product title YYY that the generated special topic page is about serves as the keywords
    <layouts>ZZZ</layouts> // The special topic category associated with the configuration file. A function of this code is embodied in the creation of the configuration file
    <widgets> // Begin configuration of a service page module
    //Create service page modules in a quantity equal to the number of service page modules. Configure each service page module using the "search head and navigate" service page module as an illustrative example. If other service page modules are to be configured, the other service page module's structure and content will be similar to the "search head and navigate" service page module
    ...
    <widget> // Begin to configure the "search head and navigate" service page module
    <name> Search head and navigate </name> The name of the service page module is "search head and navigate" and "search head and navigate" indicates that the content of the service page module is searching and navigating
    <position>header</position> //Zone on the special topic page of the "search head and navigate" service page module is "header"
    <templatePath>header/commodity_qingcheng.vm</templatePath> // Option: a storage address of HTML code of the "search head and navigate" service page module
    <cmsStatus>true</cmsStatus> // Option: Storage status of the "search head and navigate" service page module
    </widget> // Complete configuration of the "search head and navigate" service page module
    ...
    </widgets> // Complete configuration of all service page modules
    <groups> // Begin configuration of special topic content page modules
    // Create a number of special topic content page modules, and configure each special topic content page module. The configuration of the next special topic content page module is used as an illustrative example -continued Code 3

```
<group>// Begin the configuration of a special topic content page module
    <name>AAA</name> // The name of the special topic content page
module is AAA
    <keywords>BBB</keywords> // The sub-category of the category
associated with the product YYY is BBB. The product information that is looked up in the
database using the sub-category BBB as a sub-category keyword is the product information in
the special topic content page module
    <leftTemplatePath></leftTemplatePath>
    <rightTemplatePath></rightTemplatePath> //Option: The storage address
of the HTML code of the special topic content page module
    <tabTemplate></tabTemplate>
    <filter>satisfy\002998</filter> //The query condition is that the satisfaction
level for the product represented by the product information is no less than 99.8% when
displayed on the specified page
    <tab>
        <type>3144</type> //Option: The special topic content page module type
is 3144
        <name>AAA</name>
        <keywords>BBB</keywords>
    </tab>
</group>
</groups>
</category>
```

Figure 7:
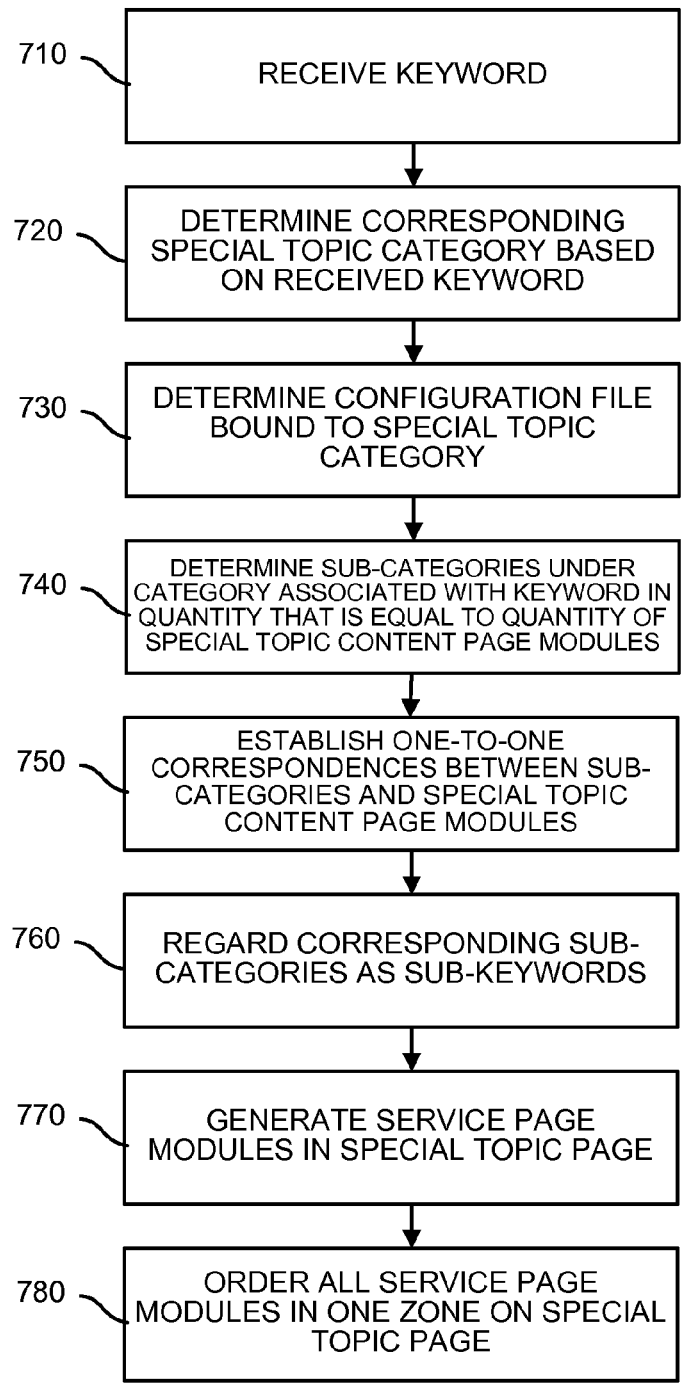
FIG. 7 is a flowchart of a method for an embodiment of generating a special topic page.

After configuration files are generated for special topic pages using the method 500 of FIG. 5A, the generated configuration files may be used to generate special topic pages. FIG. 7 is a flowchart of a method for an embodiment of generating a special topic page. In some embodiments, the method 700 is implemented by the server 1510 of FIG. 15 and includes:

In 710, the server receives a keyword.

In some embodiments, the special topic page is an aggregator page generated for a type of product within a certain special topic category. Therefore, in the event that the special topic page is to be generated, a special topic page creator (e.g., a website operator) first determines the product that the special topic page pertains to and sends the keyword (such as a product name) through an input port of the server to the server. The server executes subsequent special topic-generating operations based on the received keyword.

In 720, the server determines a corresponding special topic category based on the received keyword.

In 730, the server determines a configuration file bound to the special topic category corresponding to the received keyword based on binding relationships between pre-stored special topic categories and configuration files for special topic pages.

In some embodiments, after the configuration files are generated using process 500, binding relationships are established between the configuration files and their corresponding special topic categories, and a binding relationship is stored locally so that, when a configuration file is to be used, the configuration file can be found based on the binding relationship between a special topic category corresponding to a keyword.

In some embodiments, in the event that the received keyword is a new word without a corresponding special topic category, the special topic category corresponding to the received keyword is regarded as a new special topic category and the configuration file corresponding to the new special topic category is the default configuration file.

The process of generating a special topic page includes generating special topic content page modules and generating service page modules. The process of generating the special topic content page modules includes determining sub-categories, establishing a one-to-one correspondence between the sub-categories and the special topic content page modules, and regarding the corresponding sub-categories as sub-category keywords, and the process of generating service page modules includes generating the service page modules and ordering all service page modules in the same zone. There are no limits on the order in which the special topic content page modules and the service page modules are generated.

In 740, the server determines sub-categories under a category associated with the keyword in a quantity that is equal to a quantity of special topic content page modules in the configuration file.

In some embodiments, product information stored in a database is stored in a tree structure. Therefore, after the category associated with the keyword is determined, the various sub-categories under this category can be determined. For example, the received keyword is "iphone4," which belongs to the "iphone4" category in the mobile phone category. The sub-categories under the "iphone4" category could be: "white iphone4," "Hong Kong-version iphone4," "iphone4 authentic product wholesale," etc.

In some embodiments, the server also selects a quantity of sub-categories that is equal to the quantity of the special topic content page modules in the configuration file from among the plurality of sub-categories. Therefore, the selection is made according to a certain selection condition. For example, the selection is made according to sub-category priority levels. In other words, a certain number of popular or best-selling sub-categories is selected.

In 750, the server establishes one-to-one correspondences between the sub-categories and the special topic content page modules.

In the event that the configuration file has ordering conditions assigned to special topic content page modules, the server establishes the one-to-one correspondences between the selected sub-categories and the special topic content page modules in accordance with the ordering conditions. For example, the ordering conditions place special topic content page modules whose corresponding sub-categories have higher priority levels closer to the top of the page. Thus, the server can establish a correspondence between the sub-category with the highest priority level and the special topic content page module in the first position, and the establishing operation can be repeated until a corresponding sub-category has been established for each special topic content page module. For example, two special topic content page modules in the configuration file exist where the special topic content page module placed in the first position corresponds to "iphone4 authentic product wholesale" and the special topic content page module placed in the second position corresponds to "Hong Kong-version iphone4."

In some embodiments, in the event that no ordering condition in the configuration file assigned to the special topic content page modules exists, the server establishes in any manner the one-to-one correspondences between the sub-categories and the special topic content page modules in the configuration file.

In 760, the server regards the corresponding sub-categories as sub-category keywords, and determines the product information in each special topic content page module in accordance with a search condition assigned to each special topic content page module in the configuration file.

After the establishing of the one-to-one correspondences, the one-to-one correspondences between the special topic content page modules and the sub-categories exist. For example, when determining the product information in a special topic content page module, the sub-category corresponding to that special topic content page module is regarded as a sub-category keyword, and product information that meets the query condition for the special topic content page module is looked up in a database. Moreover, the looked up product information serves as the content of the special topic content page module. FIG. 8 is a diagram of an embodiment of a special topic content page module.

In this example, the sub-category corresponding to the special topic content page module is "iphone4 authentic product wholesale." Query conditions of the sub-category are that the click rate is at least A and that the user length of stay is at least B. Thus, the appropriate product information can be looked up in a database using "iphone4 authentic product wholesale" as the sub-category keyword, and the product information whose click rate is at least A and whose length of user stay is at least B for the represented product on the specified page is selected by filtering the looked up product information. The filtered product information is the product information included in the special topic content page module.

In the event that the query conditions are that the click rate is at least A and that the length of user stay is at least B, the server can, in addition to filtering product information as in the above example, set separate weights for the click rate and the length of stay. In some embodiments, the weights are set based on a criterion or the user's situation. The weights are set in order to have a daily display of product information that users would like to see. An example of a weighting for click rate R1, length of stay R2, and number of purchases R3 is K=A*R1+B*R2+C*R3. K is used to order product information. If K's scores are the same, product release time is used to order the product information, thus the product information that is displayed changes daily. For example, the click rate weight is R, and the length of stay weight is 1−R. Accordingly, the scoring for the search condition is K=A*R+B*(1−R). In the event that the query conditions are used to screen the product information, the click rate and length of stay for each piece of product information are scored according to the weights R and 1−R. Product information having a score no less than K may be regarded as product information meeting the query condition.

In the event that the one-to-one correspondences are established between the special topic content page modules and the sub-categories in accordance with the priority level ordering conditions for the corresponding sub-categories, during the determining of the product information in each special topic content page module, product information, which is looked up with sub-category keywords which are sub-categories with higher priority levels, is included in special topic content page modules that are placed closer to the top of the page. In other words, the higher the category order corresponding to the sub-category keyword, the higher the special topic module is ordered in the page. In other words, after the determining of the product information in each special topic content page module, not only is the product information included in each special topic content page module determined, but also the top-to-bottom sequence of the special topic content page modules embodies the priority levels of the sub-categories associated with the product information included the special topic content page modules.

Returning to FIG. 7, in 770, the server generates service page modules in the special topic page based on service page module quantity, content of each service page module, and zone of each service page module in the special topic page, as included in the configuration file.

In some embodiments, the configuration file already includes parameters for generating the service page modules. Therefore, appropriate page-generating software is used to directly generate the service page modules in the special topic page.

For example, the service page module quantity included in the configuration file is two. The content of one of the service page modules is "search," and a zone of the "search" service page module in the special topic page is a header zone. The content of the other service page module is "return to home page," and a zone of the "return to home page" service page module in the special topic page is also the header zone. Thus, the two service page modules are created directly in the header zone of the special topic page. One of the two service page modules will have the function "search," and the other's function will be "return to home page."

In 780, in the event that the configuration file includes the ordered sequence of all the service page modules located in the same zone, the server orders all the service page modules in one zone on the special topic page according to the ordered sequence.

Continuing with the example of FIG. 6 where the service page module quantity included in the configuration file is two, the "search" service page module and the "return to home page" service page module are both located in the header zone of the special topic page. The two service page modules can be ordered according to the ordered sequence assigned in the configuration file. In the event that the ordered sequence assigned in the configuration file puts the "search" service page module on top of the "return to home page" service page module, HTML code for the "search" service page module is located in front of HTML code for the "return to home page" service page module in HTML code of the special topic page.

Figure 9:
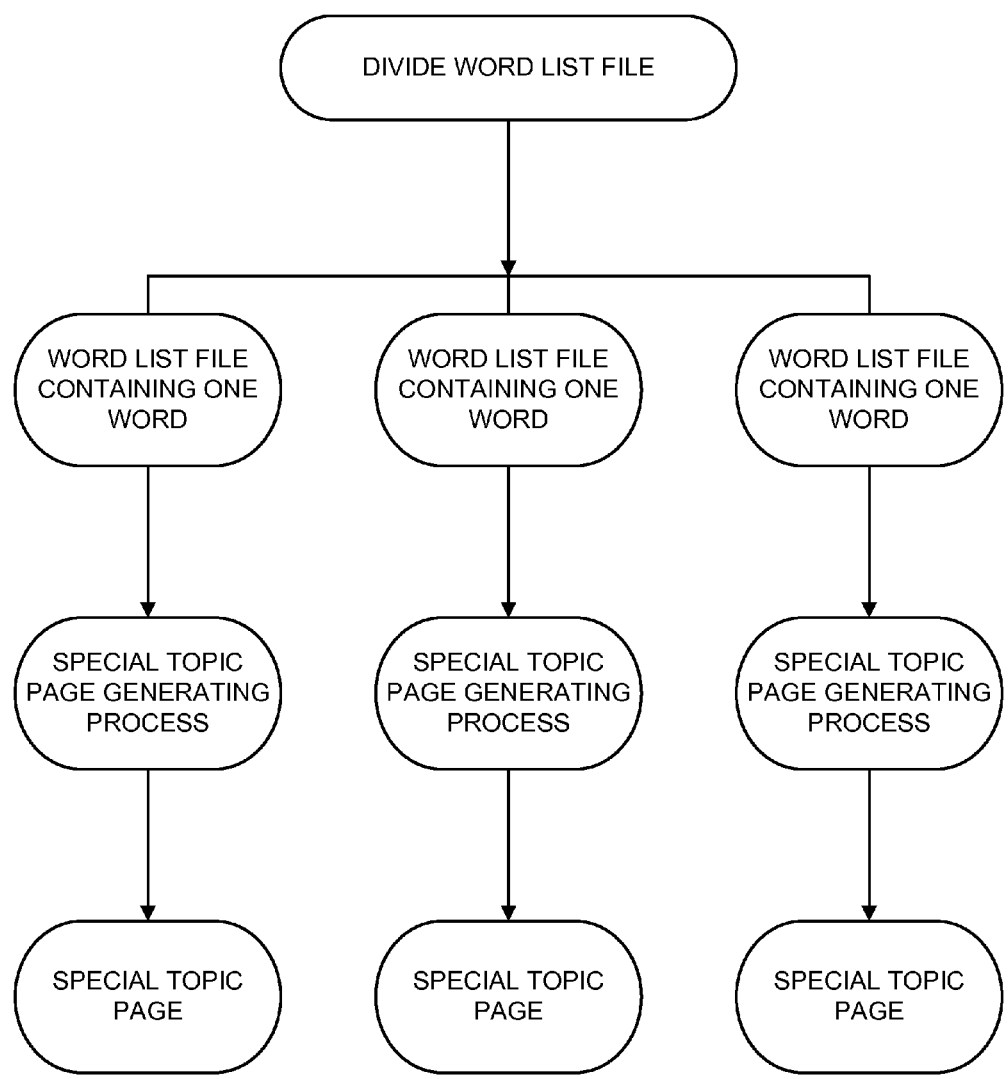
FIG. 9 is a diagram of an embodiment of a process for parallel generation of a plurality of special topic pages.

A standard special topic page is then generated after the above special topic page has undergone page rendering. When generating a plurality of special topic pages, a word list file including a plurality of keywords is received prior to the receiving of the keyword. The word list file is divided up into a plurality of word lists, and each word list includes at least one keyword. In some embodiments, each keyword is provided to the server, which performs method 700 in parallel and generates a special topic page as shown in FIG. 9. FIG. 9 is a diagram of an embodiment of a process for parallel generation of a plurality of special topic pages.

After the word list file is divided up into a plurality of word lists, different word lists can be processed in different threads in parallel. Thus, a plurality of special topic pages can be generated in parallel. In other words, a word document can be divided into a plurality of documents to generate a plurality of special topic pages in parallel.

In the event that HTML code storage addresses are assigned to the various page modules in the configuration file, after the special topic page has been generated, each generated page module is stored in its corresponding storage address. In the event that the configuration file has no assigned HTML code storage addresses, the generated special topic pages are distributed according to a predefined distribution rule, and HTML code storage for the special topic pages can be implemented as follows. For example, special topic pages are distributed according to the first letter of the keyword. In the event that the keyword is "a*" (where "*" represents an arbitrary string), the generated special topic page a*.html code is distributed for storage in Server A. In the event that the keyword is "b*," the generated special topic page b*.html code is distributed for storage in Server B. Furthermore, in some embodiments, a further subdivision can be made so that pages are distributed according to the first two letters in the keyword. For example, in the event that the keyword is "aa*," the generated special topic page aa*.html code is distributed for storage in Server A1. In the event that the keyword is "ab*," the generated special topic page ab*.html code is distributed for storage in Server A2. This approach can make full use of server resources and avoid concentrating the storage of special topic page HTML code on certain servers, which could utilize more the servers' resources while server's resources that did not store HTML code would be left idle.

Figure 10:
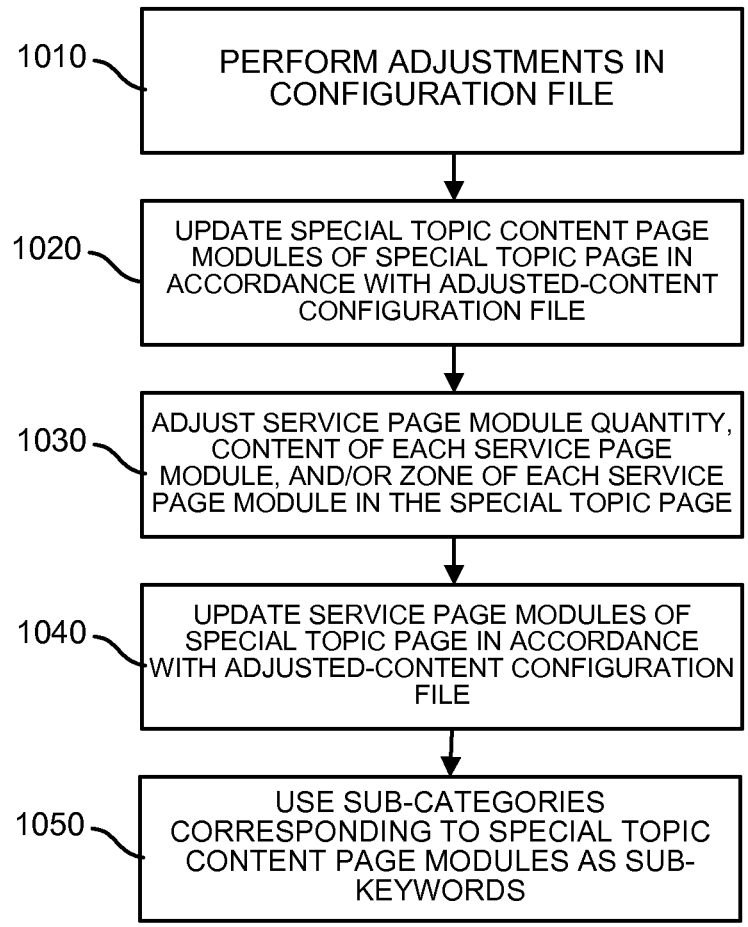
FIG. 10 is a diagram of an embodiment of a method for updating a special topic page.

After process 700 is used to generate special topic pages, the special topic pages are automatically updated in the event that updating is to be performed. FIG. 10 is a diagram of an embodiment of a process for updating a special topic page. In some embodiments, the method 1000 is implemented by a server 1510 of FIG. 15 and includes:

In 1010, in the event that the special topic page is to be updated, the server performs adjustments in the configuration file to the special topic content page module quantity, the query condition that needs to be met for product information to be included in each special topic content page module, or any combination thereof.

In the event that seasons change, a focus of Internet popularity shifts, a level of user attention changes, and/or other changes occur, product information or page formats developed for special topic pages are to be adjusted. Because the embodiment of method 700 uses configuration files corresponding to special topic categories to generate special topic pages, adjusting the content of all special topic pages generated using configuration files is possible as long as the content of the configuration files is adjusted according to the update to be performed.

In 1020, the server updates the special topic content page modules of the special topic page in accordance with the adjusted-content configuration file.

For example, referring back to FIG. 6, the special topic content page module quantity in the configuration file generated for the consumer products industry is two. The query condition for the first special topic content page module is that the click rate be at least A. The query condition for the second special topic content page module is that the user length of stay be at least B. "Iphone4" and "mp3" are two separate keywords. After the special topic pages are generated using the configuration files, the content of the special topic content page modules for the two special topic pages is as follows:

The product information placed in the first special topic content page module of the "iphone4" special topic page is product information having a click rate of at least A under "iphone4 authentic product wholesale." The product information in the second special topic content page module is product information having a length of stay of at least B under "Hong Kong-version iphone4."

The product information placed in the first special topic content page module of the "MP3" special topic page is product information having a click rate of at least A under "no FM tuner feature." The product information placed in the second special topic content page module is product information having a length of stay of at least B under "has FM tuner feature."

In this example, the server adjusts the special topic content page module quantity to three in the configuration file and the query condition of the first special topic content page module to a satisfaction level of at least C, while the query condition for the newly added third special topic content page module is UV of at least D.

In summary, in 1020, in the "iphone4" special topic page, the product information in the special topic content page module that is placed in the first position is product information having "iphone4 authentic product wholesale" as its keyword and having a satisfaction level of at least C. The original content of the special topic content page module is updated with the newly looked up product information. The content of the special topic content page module that is placed in the second position is not changed. After a new special topic content page module is added, the sub-category "white iphone4" corresponding to the special topic content page module is established. Therefore, the product information in the third special topic content page module is product information having "white iphone4" as its sub-category and a UV of at least D.

The process for updating special topic content page modules in the "MP3" special topic page is similar to the process for updating the "iphone4" special topic page. Accordingly, a further description of the process for updating special topic content page modules is omitted for conciseness.

In 1030, the server adjusts the following in the configuration file: the service page module quantity, the content of each service page module, the zone of each service page module in the special topic page, or any combination thereof.

In some embodiments, the server also adjusts parameters for special topic content page modules in configuration files, and/or parameters for service page modules in configuration files. Examples for parameters of service page modules include name, templatePath, cmsStatus, position, and maxCount. The values of the parameters are determined by the user, because each widget will have only one templatePath and only one corresponding service. These values can be edited and adjusted. For example, BBB is a module to display published information, then the maxCount parameter is adjusted according to seasonal changes, and can display more published information during peak season and display less published information during non-peak season.

In 1040, the server updates the service page modules of the special topic page in accordance with the adjusted-content configuration file.

For example, the service page module quantity in the configuration file generated for the consumer products industry is two. The content of the first service page module is "search" and is located in the header zone of the special topic page. The content of the second service page module is "return to home page," and the content of the second service page module is also located in the header zone of the special topic page. For example, using "iphone4" and "MP3" as two separate keywords, after special topic pages are generated using the configuration files, the content of the service page modules of the resulting two special topic pages are the "search" service page module and the "return to home page" service page module which are both in the header zone.

Referring back to 1030, the server adjusts the service page module quantity in the configuration file to three, and adds content "registration" to a third service page module located in the header.

Thus, in 1040, the server adds a "registration" service page module in the header zone of each of the original two special topic pages.

In 1010 and 1030, the server can periodically adjust the configuration files and automatically trigger the adjustments of the configuration files. The content of the adjustment can be determined at will, and 1010 and 1030 are not required to be adjusted at the same time. Operations 1010 and 1030 can be performed independently.

In 1050, when product information in a database is updated or the time for periodic updating occurs, the server uses sub-categories corresponding to the special topic content page modules as sub-category keywords, again looks up product information that meets the query conditions for the special topic content page modules in the database, and updates the content in the special topic content page modules based on the newly looked up product information.

In operations 1010 through 1040, the operations implement special topic page content by adjusting the configuration file. In addition, in 1050, whenever the product information in a database is updated or the time for periodic updating occurs, the server can always re-determine the content in the special topic content page module in accordance with operations 740 to 760, regardless of whether the configuration file has been adjusted. Accordingly, the special topic content page module can be updated.

In the event that an abnormality occurs (e.g., failure to find product information meeting a query condition), when the special topic page is updated in accordance with the adjusted configuration file or new product information in the database, the server activates an alarm. For example, the server records events including abnormalities in a log. When the abnormality occurs, the server sends the log to the administrator via email, SMS text, etc. to alert the administrator.

After the special topic page is updated, the updated HTML code is substituted for the original HTML code and stored in an appropriate location on the server, and the change in content is displayed to the website operator.

Figure 11:
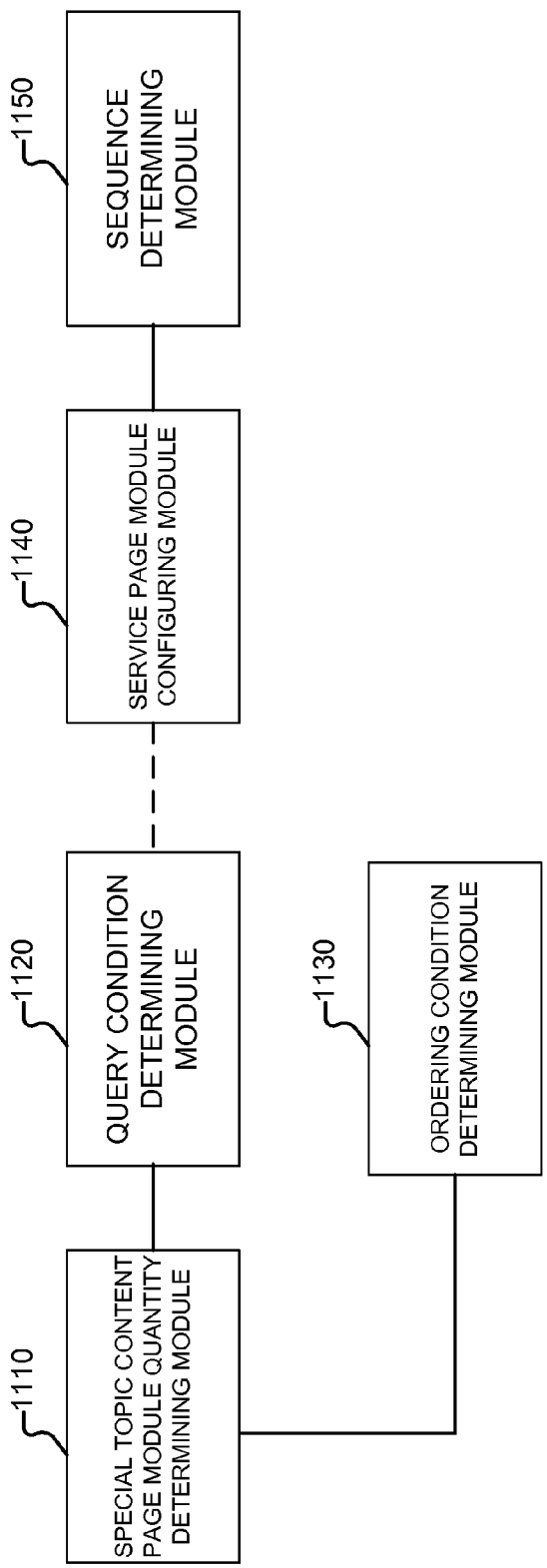
FIG. 11 is a structural diagram of an embodiment of a device for generating special topic page configuration files.

FIG. 11 is a structural diagram of an embodiment of a device for generating special topic page configuration files. In some embodiments, the device 1100 performs all of the operations of the method 500 of FIG. 5A and includes a special topic content page module quantity determining module 1110 and a query condition determining module 1120.

The special topic content page module quantity determining module 1110 determines a special topic content page module quantity in a configuration file.

The query condition determining module 1120 determines a query condition that product information included in each special topic content page module is to meet.

In some embodiments, the device 1100 further includes an ordering condition determining module 1130.

The ordering condition determining module 1130 assigns an ordering condition for each special topic content page module. In some embodiments, the higher a priority level of a sub-category associated with the included product information, the closer to the top the special topic content page module is positioned.

Furthermore, in some embodiments, the device 1100 also includes a service page module configuring module 1140 and a sequence determining module 1150.

The service page module configuring module 1140 determines, in the configuration file, a service page module quantity, content in each service page module, and a zone of each service page module in a special topic page.

The sequence determining module 1150 assigns an ordered sequence to all service page modules in one zone in the event that a plurality of service page modules are located in the same zone of the special topic page.

Because the query condition determining module 1120 and the ordering condition determining module 1130 depend on the quantity determined by the special topic content page module quantity determining module 1110, these three modules are connected by a solid line. The sequence determining module 1150 depends on zone information assigned in the service page module configuring module 1140. Therefore, these two modules are connected by a solid line. However, the special topic content page module quantity determining module 1110, the query condition determining module 1120, and the ordering condition determining module 1130 relating to the configuration of service page modules is considered to be one part, and the service page module configuring module 1140 and the sequence determining module 1150 relating to the configuration of special topic content page modules is considered to be another part. Since these two parts are not closely related, the two parts are connected by a dashed-line.

Figure 12:
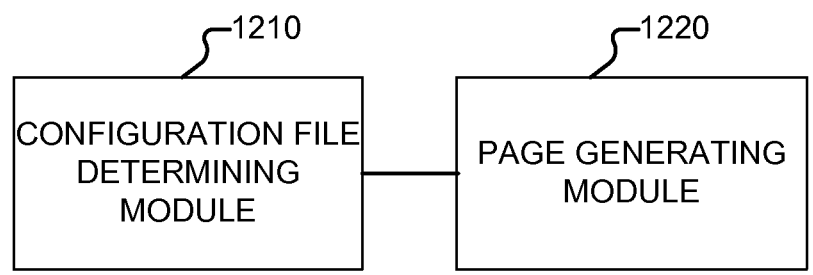
FIG. 12 is a structural diagram of an embodiment of a device for generating special topic pages.

FIG. 12 is a structural diagram of an embodiment of a device for generating special topic pages. In some embodiments, the device 1200 performs the method 700 and includes a configuration file determining module 1210 and a page generating module 1220.

The configuration file determining module 1210 determines, based on a binding relationship between pre-stored special topic categories and configuration files for special topic pages, a configuration file bound to a special topic category corresponding to a received keyword.

The page generating module 1220 determines a quantity of sub-categories under a category associated with a keyword that is equal to the quantity of special topic content page modules in the configuration file and performs the following operations with respect to a sub-category: regards the sub-category as a sub-category keyword in the special topic content page module, looks up the product information that meets the query condition in the special topic content page module in a database, regards the looked up product information as content in the special topic content page module, and generates a special topic content page module within the special topic page.

The page generating module 1220 also regards the product information looked up using the sub-category keyword, which is a sub-category with a higher priority level, as content in a special topic content page module that is positioned closer to the top in the special topic page.

The page generating module 1210 also generates service page modules in the special topic page based on the service page module quantity included in the configuration file, the content of each service page module, and the zone of each service page module in the special topic page.

The page generating module 1210 also uses, when the configuration file includes the ordered sequence of all the service page modules located in the same zone, all the service modules in one zone on the special topic page and orders all the service page modules based on the ordered sequence after the generating of the service page modules in the special topic page.

Figure 13:
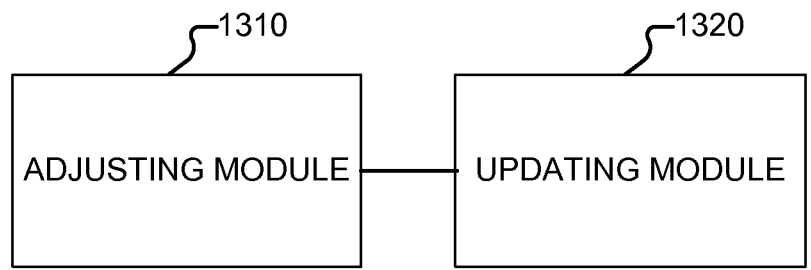
FIG. 13 is a structural diagram of an embodiment of a device for updating special topic pages.

FIG. 13 is a structural diagram of an embodiment of a device for updating special topic pages. In some embodiments, the device 1300 performs the method 1000 and includes an adjusting module 1310 and an updating module 1320.

The adjusting module 1310 performs, for special topic page updates, adjustments to special topic content page module quantities, the query conditions that are to be met for product information included in each special topic content page module, or a combination thereof.

The updating module 1320 updates special topic page modules on a special topic page in accordance with an adjusted-content configuration file.

The adjusting module 1310 also performs adjustments on the following in the configuration file: a service page module quantity, a content of each service page module, a zone of each service page module in the special topic page, or any combination thereof.

The updating module 1320 also updates service page modules of the special topic page based on the adjusted-content configuration file.

The updating module 1320 also uses, when product information in a database is updated or the time for periodic updating occurs, the sub-categories corresponding to the special topic content page modules as sub-category keywords, looks up again product information that meets query conditions in the special topic content page modules in the database, and updates the content in the special topic content page modules based on the newly looked up product information.

Figure 14:
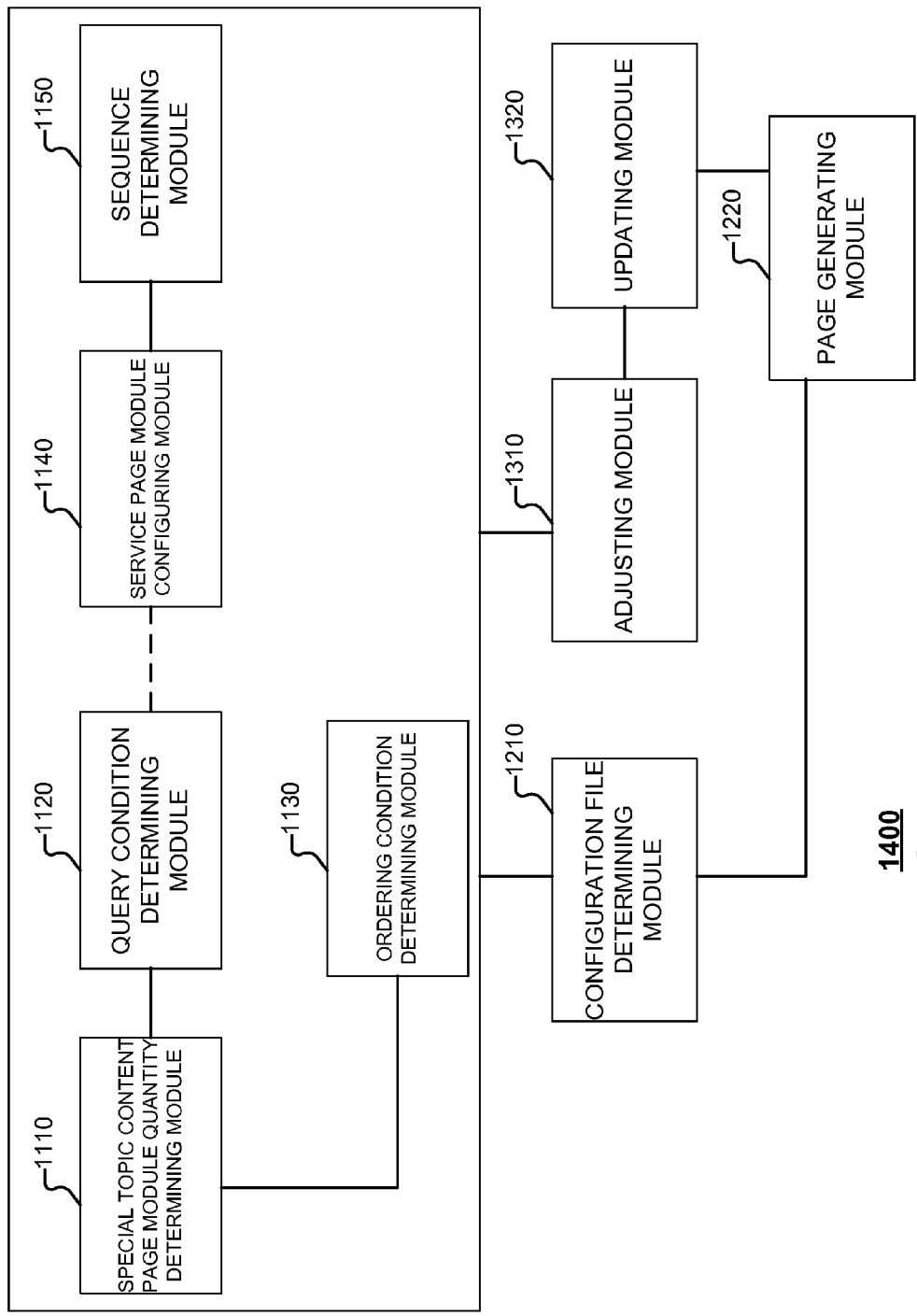
FIG. 14 is a diagram of an embodiment of a device for generating a special topic page configuration file and for generating and updating special topic pages.

FIG. 14 is a diagram of an embodiment of a device for generating a special topic page configuration file and for generating and updating special topic pages. In some embodiments, the device 1400 includes the device 1100, the device 1200, and the device 1300. In some embodiments, after a configuration file is generated using the special topic content page module quantity determining module 1110, the query condition determining module 1120, the ordering condition determining module 1130, the service page module configuring module 1140, and the sequence determining module 1150, the configuration file determining module 1210 invokes the configuration file, and the page generating module 1220 generates the special topic page based on the configuration file for the special topic content page modules and the service page modules in the configuration file. In the event that the generated special topic page is to be updated, the adjusting module 1310 adjusts the content of the configuration file and then the updating module 1320 invokes the page generating module 1220 to update the special topic page using the adjusted configuration file. When product information in a database is updated or the time for periodic updating occurs, the updating module 1320 also again looks up updated content in the database to update the special topic content page modules.

With the scheme provided, configuration files are generated for special topic categories. With one configuration file, generating a vast number of special topic pages belonging to a single special topic category is possible so that, when special topic pages are updated, the content of all the special topic pages generated using the configuration file is updated directly as a result of an adjustment of the content of the configuration file. Even if a user is confronted with a vast quantity of special topic pages to be updated, the user only adjusts a relatively small number of configuration files in order to achieve automatic batch updating of the special topic pages. Thus the efficiency of special topic page updating is increased. In addition, because updating a large number of special topic pages one at a time is not necessary, operator-caused content adjustment mistakes can be avoided.

Figure 15:
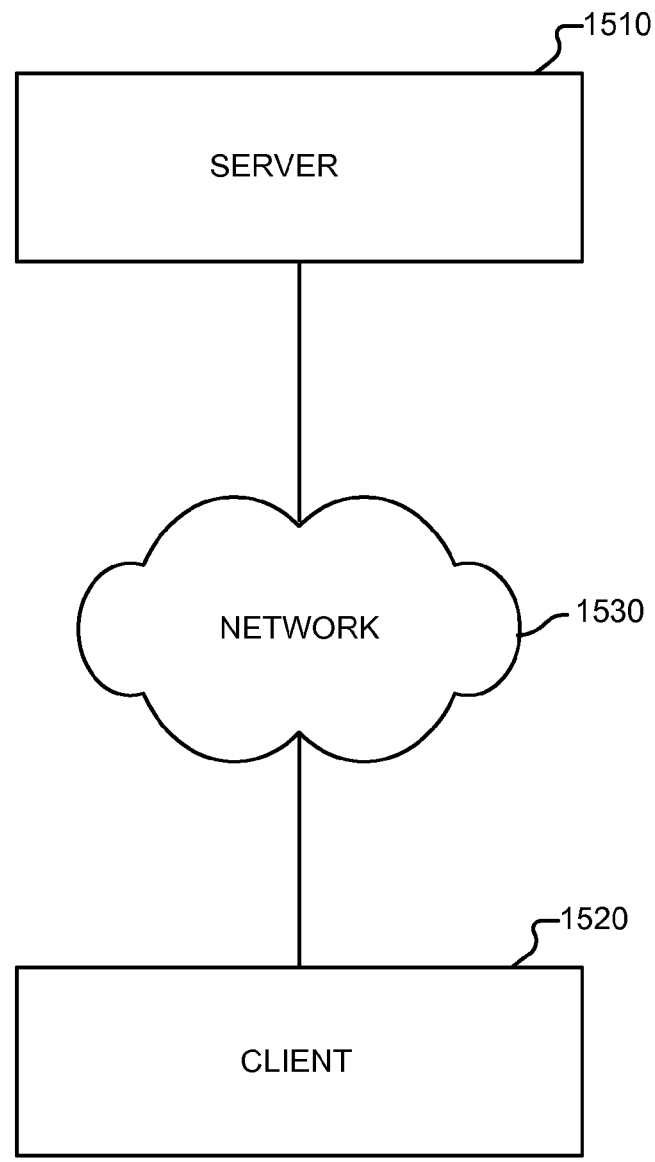
FIG. 15 is a diagram of an embodiment of a system for generating and updating special topic pages.

FIG. 15 is a diagram of an embodiment of a system for generating and updating special topic pages. The system 1500 includes a client 1520 communicating with a server 1510 over a network 1530.

A user using the client 1520 is able to browse a special topic page on the server 1510 via a browser across the network 1530.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for generating special topic pages, comprising:
    determining, based on binding relationships between pre-stored special topic categories and configuration files for a special topic page, a configuration file bound to a special topic category corresponding to a received keyword, the configuration file including a special topic content page module quantity and a query condition to be met for product information to be included in a plurality of special topic content page modules;

determining sub-categories that are under a category associated with the keyword in a quantity equal to the special topic content page module quantity in the configuration file, wherein the sub-categories are regarded as sub-category keywords in special topic content page modules;

looking up product information that meets the query condition for the special topic content page modules in a database, wherein the looked up product information is regarded as content in the special topic content page modules; and generating the special topic content page modules within the special topic page, comprising:
 ordering the special topic content page modules on the special topic page based at least in part on scores of the special topic content page modules, comprising:
  weighing a first factor of a special topic content page module by a first weight to obtain a first weighted factor;
  weighing a second factor of the special topic content page module by a second weight to obtain a second weighted factor; and
  determining a score of the special topic content page module based at least in part on the first and second weighted factors of the special topic content page module, the first weight being different from the second weight, the first factor being different from the second factor, the first factor and the second factor each including click rate, length of stay, or number of purchases.

2. The method as described in claim 1, wherein the looked up product information having a higher priority level than another product information serves as content in a special topic content page module that is positioned closer to a top portion in the special topic page than the other product information.

3. The method as described in claim 1, further comprising:
generating service page modules in the special topic page based at least on: service page module quantity, content of each service page module, and zone of each service page module in the special topic page, the configuration file including the service page module quantity, the content of each service page module, and the zone of each service page module in the special topic page.

4. The method as described in claim 3, further comprising:
in the event that the configuration file includes an ordered sequence of all the service page modules located in a same zone, ordering the service modules in one zone on the special topic page based on the ordered sequence after the generating of the service page modules in the special topic page.

5. A method as described in claim 1, further comprising:
updating the generated special topic page, comprising:
 in the event that the special topic page is to be updated:
  performing one or more adjustments in the configuration file to the special topic content page module quantity, the query condition to be met for product information contained in the plurality of special topic content page modules, or a combination thereof; and
  updating the special topic content page modules of the special topic page based on the configuration file that has been adjusted.

6. The method as described in claim 5, wherein the updating of the generated special topic page further comprises:
performing adjustments to the following in the configuration file: service page module quantity, content of each service page module, zone of each service page module in the special topic page, or any combination thereof; and updating service page modules of the special topic page based on the configuration file that has been adjusted.

7. The method as described in claim 5, further comprising:
in the event that the product information in the database is updated or a time for periodic updating occurs:
 looking up product information meeting the query condition for the special topic content page modules in the database using the sub-categories corresponding to the special topic content page modules as the sub-category keywords; and
 updating the content in the special topic content page modules based on the looked up product information.

8. A device for generating special topic pages, comprising:
at least one processor configured to:
 determine, based on binding relationships between pre-stored special topic categories and configuration files for a special topic page, a configuration file bound to a special topic category corresponding to a received keyword, the configuration file including a special topic content page module quantity and a query condition to be met for product information to be included in a plurality of special topic content page modules;
 determine sub-categories that are under a category associated with the keyword in a quantity equal to the special topic content page module quantity in the configuration file, wherein the sub-categories are regarded as sub-category keywords in special topic content page modules;
 look up product information that meets the query condition for the special topic content page modules in a database, wherein the looked up product information is regarded as content in the special topic content page modules; and
 generate the special topic content page modules within the special topic page, comprising to:
  order the special topic content page modules on the special topic page based at least in part on scores of the special topic content page modules, comprising to:
   weigh a first factor of a special topic content page module by a first weight to obtain a first weighted factor;
   weigh a second factor of the special topic content page module by a second weight to obtain a second weighted factor; and
   determine a score of the special topic content page module based at least in part on the first and second weighted factors of the special topic content page module, the first weight being different from the second weight, the first factor being different from the second factor, the first factor and the second factor each including click rate, length of stay, or number of purchases; and a memory coupled to the at least one processor and configured to provide the at least one processor with instructions.

9. The device as described in claim 8, wherein the looked up product information having a higher priority level than another product information serves as content in a special topic content page module that is positioned closer to a top portion in the special topic page than the other product information.

10. The device as described in claim 8, wherein the at least one processor is further configured to:
generate service page modules in the special topic page based at least on: service page module quantity, content of each service page module, and zone of each service page module in the special topic page, the configuration file including the service page module quantity, the content of each service page module, and the zone of each service page module in the special topic page.

11. The device as described in claim 10, wherein the at least one processor is further configured to:
in the event that the configuration file includes an ordered sequence of all the service page modules located in a same zone, order the service modules in one zone on the special topic page based on the ordered sequence after the generating of the service page modules in the special topic page.

12. A device as described in claim 8, wherein the at least one processor is further configured to:
update the generated special topic page, comprising to:
in the event that the special topic page is to be updated:
perform one or more adjustments in the configuration file to the special topic content page module quantity, the query condition to be met for product information contained in the plurality of special topic content page modules, or a combination thereof; and
update the special topic content page modules of the special topic page based on the configuration file that has been adjusted.

13. The device as described in claim 12, wherein the updating of the generated special topic page further comprises:
perform adjustments to the following in the configuration file: service page module quantity, content of each service page module, zone of each service page module in the special topic page, or any combination thereof; and
update service page modules of the special topic page based on the configuration file that has been adjusted.

14. The device as described in claim 12, wherein the at least one processor is further configured to:
in the event that the product information in the database is updated or a time for periodic updating occurs:
look up product information meeting the query condition for the special topic content page modules in the database using the sub-categories corresponding to the special topic content page modules as the sub-category keywords; and
update the content in the special topic content page modules based on the looked up product information.

15. A computer program product for generating special topic pages, the computer program product being embodied in a tangible non-transitory computer readable storage medium and comprising computer instructions for:
determining, based on binding relationships between pre-stored special topic categories and configuration files for a special topic page, a configuration file bound to a special topic category corresponding to a received keyword, the configuration file including a special topic content page module quantity and a query condition to be met for product information to be included in a plurality of special topic content page modules;
determining sub-categories that are under a category associated with the keyword in a quantity equal to the special topic content page module quantity in the configuration file, wherein the sub-categories are regarded as sub-category keywords in special topic content page modules;
looking up product information that meets the query condition for the special topic content page modules in a database, wherein the looked up product information is regarded as content in the special topic content page modules; and
generating the special topic content page modules within the special topic page, comprising:
ordering the special topic content page modules on the special topic page based at least in part on scores of the special topic content page modules, comprising:
weighing a first factor of a special topic content page module by a first weight to obtain a first weighted factor;
weighing a second factor of the special topic content page module by a second weight to obtain a second weighted factor; and
determining a score of the special topic content page module based at least in part on the first and second weighted factors of the special topic content page module, the first weight being different from the second weight, the first factor being different from the second factor, the first factor and the second factor each including click rate, length of stay, or number of purchases.

* * * * *

UNITED STATES PATENT AND TRADEMARK OFFICE
CERTIFICATE OF CORRECTION

PATENT NO. : 9,535,984 B2  
APPLICATION NO. : 14/159176  
DATED : January 3, 2017  
INVENTOR(S) : Xudong Chen, Yidong Xie and Dongming Ji Page 1 of 1

It is certified that error appears in the above-identified patent and that said Letters Patent is hereby corrected as shown below:

In the Specification

In Column 2, Line 10, table Code 1, delete "iv id="shopsearch">" and insert --<div id="shopsearch">--, therefor.

Signed and Sealed this  
Third Day of October, 2017

Joseph Matal  
*Performing the Functions and Duties of the*  
*Under Secretary of Commerce for Intellectual Property and*  
*Director of the United States Patent and Trademark Office*